Figure 1:
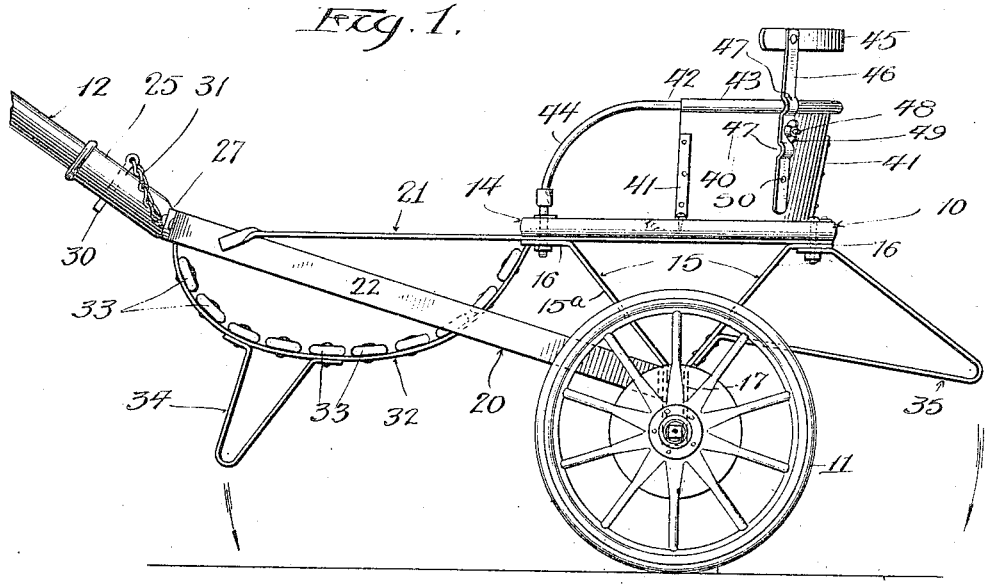

S. J. TURNER.
CART.
APPLICATION FILED MAY 31, 1912. RENEWED JULY 25, 1917.

1,259,466.

Patented Mar. 12, 1918.
2 SHEETS—SHEET 1.

Witnesses:
S. B. Thomas.
Fannie F. Richards.

Inventor:
Samuel J. Turner,
by Charles O. Hervey
his Atty

S. J. TURNER.
CART.
APPLICATION FILED MAY 31, 1912. RENEWED JULY 25, 1917.
1,259,466.
Patented Mar. 12, 1918.
2 SHEETS—SHEET 2.
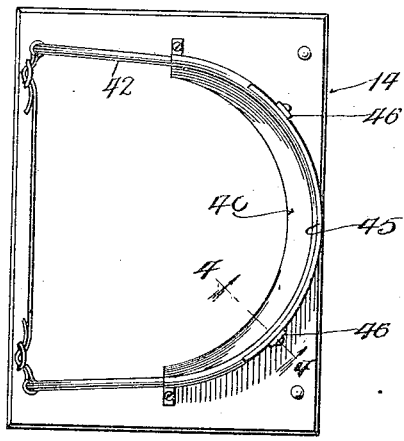
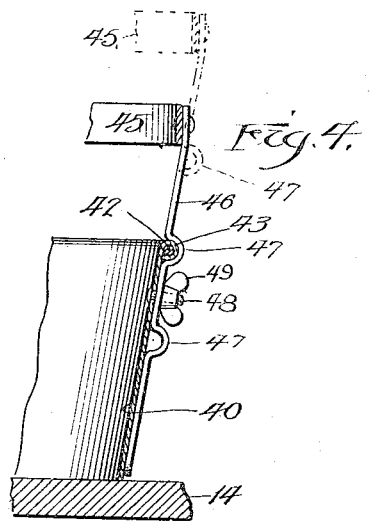
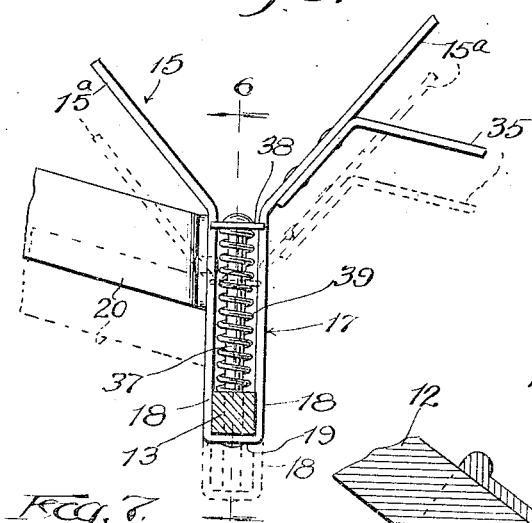
Witnesses:
S. N. Thomas.
Fannie F. Richards.
Inventor.
Samuel J. Turner,
by Charles O. Shirvey
his Atty

UNITED STATES PATENT OFFICE.

SAMUEL J. TURNER, OF CHICAGO, ILLINOIS, ASSIGNOR TO WILLIAM S. FERRIS, OF ELKHART, INDIANA.

CART.

1,259,466.

Specification of Letters Patent. Patented Mar. 12, 1918.

Application filed May 31, 1912, Serial No. 700,730. Renewed July 25, 1917. Serial No. 182,799.

*To all whom it may concern:*

Be it known that I, SAMUEL J. TURNER, a citizen of the United States, residing at Chicago, in the county of Cook and State of Illinois, have invented new and useful Improvements in Carts, of which the following is a specification.

This invention relates to carts of that class used for conveying children, and its main object is to provide a simple, strong and substantial cart of this class that may receive more than the average rough usage, without seriously injuring the same. Another object is to provide the seat of the cart with an extensible back portion whereby the latter may be raised or lowered to properly support the child's back; another object is to provide back stops of improved form whereby certain objectionable features, now present in the ordinary back stop, are wholly eliminated; another object is to provide a simple form of footrest for the cart; another object is to provide an improved spring connection between the axle and body of the cart to take up the jar occasioned in going over rough or uneven places; another object is to provide means whereby the handle of the cart may be readily detached or secured in place. Other objects and advantages will occur in the course of this specification and with all of said objects in view, the invention consists in the several novel features of construction and arrangement hereinafter fully set forth and particularly defined in the claims.

The invention is clearly illustrated in the drawings furnished herewith in which:—

Figure 2:
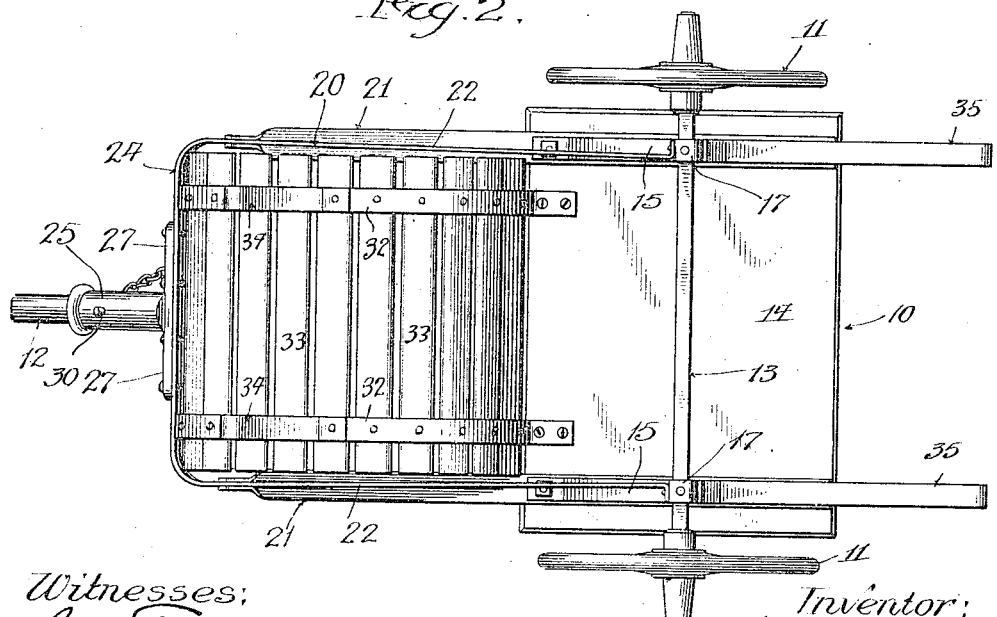

Figure 1 is a side elevation of a cart, embodying one form of the present invention with its handle partly broken away, Fig. 2 is an underplan of the parts seen in Fig. 1, Fig. 3 is a plan of the seat, Fig. 4 is a detail vertical section taken on the line 4—4 of Fig. 3, Fig. 5 is a detail transverse section through the axle and showing the spring connection between said axle and the frame of the body, Fig. 6 is a detail vertical cross section taken on the side 6—6 of Fig. 5, Fig. 7 is a plan of the parts seen in Fig. 5 and Fig. 8 is a central vertical longitudinal section taken through the handle socket and handle.

Referring to said drawings, which show one embodiment of the present invention, the cart will be seen to comprise, in general, a body portion 10, carried by a pair of wheels 11, journaled upon an axle 13, and a handle 12, by means of which the cart may be drawn or pushed along. The main frame of the body portion is preferably made up of strips or bars of metal carried upon the axle 13, of the cart and said frame supports the seat 14, above the axle. Projecting down from the bottom of the seat are a pair of seat supporting members 15, each of which comprises a strip or bar of metal, substantially V shape in form and having horizontally bent end portions 16, bolted or otherwise secured to the underside of the seat. The lower end of each seat supporting member 15, has a downwardly extending loop portion 17, comprising two legs 18, which straddle the axle 13, and are connected together underneath the same as seen at 19, in Fig. 5. Usually one strip of metal is employed for each seat supporting member bent up into the form shown. Rigidly secured to the forward arms 15$^a$ of the seat supporting members, is a yoke or U shaped frame member 20, which extends toward the front end of the cart in an upwardly inclined direction, as seen in Fig. 1. A pair of horizontal frame members 21, (usually strips of metal) are secured to the underside of the seat, between the latter and the seat supporting members 15, and extend forward to a point where they join the side bars 22, of the frame member 20, at which point said horizontal bars 21, are split lengthwise and the forked ends bent down and secured to the sides of the bars 22 (see Figs. 1 and 2). Any well known method may be employed for securing said parts together, for instance they may be riveted or electrically welded together. Secured to the cross bar 24, of the frame member 20, is a handle socket member 25, adapted to receive the handle 12, said socket member having two legs 27, lying against the front face of the cross bar 24, and being riveted or otherwise secured thereto. The socket member 25, and handle 12, are formed with registering holes 28, 29, through which may be inserted a pin or bolt 30, for detachably securing the handle in the socket of the socket member. If desired, a chain 31, may be provided between the pin and cross bar 24, for furnishing a connection between the two to prevent loss of the pin. Secured to the cross bar 24, and to the seat 14, are metal strips 32, which are bowed or bent downwardly as seen in Fig. 1 and to said strips 32, are riveted or otherwise secured a number of transversely extending slats 33, said slats or strips forming a footrest for the child's feet.

Secured to and projecting down from each strip 32, is a leg 34, each preferably made up of a strip of metal bent back upon itself at the middle to form a U shape, the ends thereof being bent out and riveted or otherwise secured to the strip 32. Said legs serve to support the front end of the cart when left standing alone. Secured to and projecting backward and downward from the rear bars of the seat supporting members 15, are backstops 35, each preferably made up of a strip of metal bent back upon itself approximately at its middle point into the form of a V; one leg thereof is bolted or otherwise secured to the underside of the seat and the other leg is riveted or otherwise fastened to the lower end of the seat supporting member 15. Said backstops are of such length as to prevent the cart from tipping over backward in case it is tilted backward beyond the center of gravity and the handle released. By employing two of such backstops, one near each side thereof, any danger of the cart tilting over sidewise, when the same is passing from a curbstone down to the ground, is wholly avoided because if the curbstone is so high that the backstops strike it, then both of said stops ride on the curbstone, whereas in carts where only one backstop is used, and that at the middle line, then when the latter rides upon the curbstone, there is always the danger of the cart tipping to one side or the other, thereby endangering the child to injury.

Secured to the part 19, of each seat supporting member 15, and projecting up through holes 36, in the axle 13, are bolts or headed pins 37, and below the head of each bolt is a cross piece or strut 38, notched out as at 39ª, to fit between the two legs 18, of the loop 17. Between each cross piece or strut 38, and the axle 13, is a coiled compression spring 39, which encircles the bolt or pin 37, and yieldingly supports the body of the cart on the axle 13. The weight of the body and child is transmitted to the springs by the bolts or headed pins 37, and the springs are partially compressed by the downward movement of the bolts or pins 37.

The seat 14, is formed with a stationary back piece 40, preferably semi-circular in form, said back piece being secured to the seat proper by means of brackets 41, riveted to the back piece and screwed or otherwise fastened to the seat. The upper edge of the back piece 40, is reinforced by means of a rod 42, which is curved to fit said upper edge, and the latter is curled around said rod as seen at 43. The forward ends of the rods are bent downward to form the arms 44, of the seat and the lower ends of the arms are passed through the seat, the bars 21, and front arms 15ª, of the seat supporting members 15, and nuts are secured upon their threaded ends to secure those parts together.

Above the back piece 40, is a vertically adjustable back piece 45, preferably comprising an arc shaped strip of metal having a number of downwardly projecting posts 46, that are arranged to lie contiguous with the outer face of the back piece 40. The posts are formed with a number of U-shaped bends 47, between their ends, each of which is adapted to embrace the upper curled edge of the back piece 40, and said posts are secured to said back piece by bolts 48, that extend out through the back piece and wing nuts 49, threaded upon said bolts and bearing against the posts. Boltholes 50, are provided in said posts to receive the bolts 48, one bolthole being located between the bends and one therebelow, and it is obvious that by unscrewing the wing nuts the bolts may be withdrawn from the posts, the posts raised from the position shown in full lines in Fig. 4, to bring the lower bends over the upper curled edge of the back and the wing nuts thereafter screwed upon the bolts, thereby securing the back piece 45, at the high point shown in dotted lines in Fig. 4.

From the above description, it is perfectly obvious that a simple, strong and substantial cart results from such construction; the parts are easy to manufacture and assemble and when assembled are capable of a great deal of rough handling and usage.

I realize that various alterations and modifications of this device are possible without departing from the spirit of my invention and I do not therefore desire to limit myself to the exact form of construction shown and described.

I claim as new and desire to secure by Letters Patent:

1. In a cart of the class described, a wheeled frame, comprising two parallel bars connected at their forward end by a cross bar, a handle socket member having two legs secured to the cross bar of said frame, a handle adapted to be inserted in the socket of said socket member, said socket member and handle having registering holes therein, and a pin adapted to be inserted in said holes to detachably secure the handle in the handle socket member.

2. In a cart of the class described, a pair of wheels, an axle carried thereby, a pair of seat supporting members each comprising a single bar bent to form a V shaped seat support and having a pair of downwardly projecting legs straddling the axle and connected together below the axle, a headed pin secured to each connection portion of the seat supporting member, and a coiled compression spring inserted between the headed end of each pin and the axle.

3. In a cart of the class described, a pair of wheels, a pair of seat supporting members each substantially of V formation, each having two downwardly projecting legs joined together at their lower ends by a cross piece and straddling said axle, a headed pin secured to said cross piece of the seat supporting member and having a strut underneath its head engaging said legs to hold the pin in an upright position, and a coiled compression spring interposed between said strut and axle and yieldingly sustaining said seat support.

4. In a cart of the class described, a pair of wheels, an axle therefor, a pair of V shaped seat supporting frame bars yieldingly supported upon said axle, a U shaped frame bar, the ends of which are secured to said V shaped seat supporting frame bars, braces extending between the upper ends of said V shaped seat supporting frame bars and U shaped frame bar and a seat supported upon said seat supporting bars.

5. In a cart of the class described, a pair of wheels, an axle therefor, seat supporting frame members carried by said axle, a U shaped frame extending forward from said seat members, a handle secured to said U shaped frame, and two downward and rearwardly extending posts secured to said seat supporting members, each post being located at one side of the center of gravity of the cart.

6. A go-cart for conveying children comprising a single pair of wheels which in height approximate the height of an ordinary street curb, in combination with a metallic frame structure supported by said wheels, a seat on said frame above said wheels, said frame including a cross-bar at the forward end, a handle slanting forward and upward substantially from the middle of said cross bar, said cross bar being sufficiently remote from the forward edge of the seat to provide space sufficient to admit the feet and legs of a child, a foot-well suspended in said space, front and rear struts extending respectively below said foot-well, and rearward of said seat and wheels, to limit the longitudinal tipping of the go-cart, and said struts at the rear being widely separated to prevent lateral tipping of the go-cart when as in passing over a curb the wheels are not in contact with the ground.

7. A go-cart for conveying children comprising a single pair of wheels which in height approximate the height of an ordinary street curb, in combination with a metallic frame structure supported by said wheels, a seat on said frame above said wheels, said frame including a cross-bar at the forward end, a handle slanting forward and upward substantially from the middle of said cross bar, said cross bar being sufficiently remote from the forward edge of the seat to provide space sufficient to admit the feet and legs of a child, a foot-well suspended in said space, anti-tipping struts extending respectively below said foot-well and rearward of said seat and wheels, said struts at the rear being widely separated and so positioned that their rear ends are normally above the wheel centers to better assist in passing over curbs.

In witness whereof, I have hereunto signed my name at Chicago, Cook county, Illinois, this 24th day of May 1912.

SAMUEL J. TURNER.

Witnesses:
  MAX W. HEINRICHS,
  MARY E. DOHERTY.

Copies of this patent may be obtained for five cents each, by addressing the "Commissioner of Patents, Washington, D. C."